INVENTOR
ROBERT F. ROTHSCHILD
BY
ATTORNEY

Jan. 30, 1951   R. F. ROTHSCHILD   2,539,482
RADIO NAVIGATION SYSTEM
Filed Feb. 19, 1947   2 Sheets-Sheet 2

INVENTOR
ROBERT F. ROTHSCHILD
BY
Paul B. Hunter
ATTORNEY

Patented Jan. 30, 1951

2,539,482

UNITED STATES PATENT OFFICE 2,539,482

RADIO NAVIGATION SYSTEM

Robert F. Rothschild, Hempstead, N. Y., assignor to The Sperry Corporation, a corporation of Delaware Application February 19, 1947, Serial No. 729,525

14 Claims. (Cl. 343—102)

This invention relates generally to radio navigation systems for use on aircraft, marine vessels, and other mobile craft, and the invention relates more particularly to a novel radio navigation system comprising a radio direction finder in combination with a radio beacon receiver to give continuous indication of the craft heading.

Heretofore, radio navigation apparatus has been available to provide navigation "fixes" but, in general, existing radio systems do not provide automatic indication of craft heading and the pilot must obtain several fixes and then mentally or mechanically compute his heading. The present invention integrates the information received from an omniazimuthal beacon with direction finder information, and from these two variables computes the third variable, namely, the craft heading.

The invention utilizes a fixed station radio beacon of the type having a rotating beam and adapted to transmit signals characteristic of the instantaneous direction of said beam, and an automatic radio direction finder in the craft responsive to signals from the beacon position. It combines signals determined by the bearing of the transmitter beacon relative to the craft as determined by the direction finder, with signals derived from the absolute bearing as transmitted by the beacon, to thereby obtain the absolute craft heading.

An advantage of such an arrangement is that it is possible to obtain an absolute craft heading entirely by radio means, thus avoiding any error due to the earth's magnetic variation. For high-speed aircraft, these magnetic variations present a considerable problem, especially when operating near the magnetic poles, and magnetic compasses used under such conditions require frequent corrections. Also, during turns the magnetic compass is temporarily disabled. The invention is quite flexibile and by means of suitable switching arrangements will yield the third variable when any two variables are supplied. For instance, in one switching position the craft heading may be supplied to the computer from a conventional compass and the beacon angle from the beacon receiver and the direction finder angle will be automatically computed and indicated and, in addition, the directional antenna will be automatically preset in the desired direction, as will be more fully disclosed hereafter.

The invention is also admirably adapted to apply this computed information to an automatic pilot, thereby enabling a desired course to be flown.

The present invention differs from conventional radio beam homing devices in that it enables the craft to fly any desired course and provides automatic, continuous radio indications of the absolute heading of the craft at all times, providing there is a beacon station within range. The present invention does not add appreciable additional airborne equipment to the craft as most crafts are presently equipped with automatic radio direction finders and the same receiver may be adapted to be used for both the direction finder and beacon reception. The present invention may be also adapted to exercise "slave" control over conventional directional gyros in the same manner as the magnetic "slave" control generally used in present gyro magnetic compasses.

Accordingly, an object of the present invention is to obtain an automatic, continuous indication of the absolute heading of the craft by means that is independent of magnetic variation and deviation.

Another object of the invention is to obtain the absolute heading of the craft by radio means by utilizing a fixed ground station, omniazimuthal radio beacon of the type transmitting signals characteristics of their absolute bearing, in combination with a craft automatic radio direction finder.

The invention also relates to the novel features or principles of the instrumentalities described herein, whether or not such are used for the stated objects, or in the stated fields or combinations.

Other objects and advantages of the present invention will be apparent from the following description and illustrations wherein, Fig. 1 is a diagram illustrative of the principles of operation;

Figure 1:
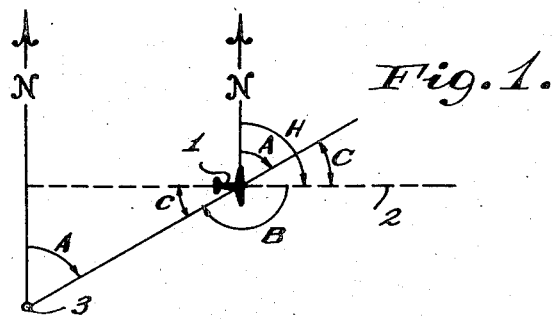

Referring to Fig. 1, there is shown a craft 1 whose heading is indicated by line 2, and a radio beacon transmitter 3. The beacon transmitter 3 may be of a type well-known to the art, which transmits a rotating beam and whose signals are modulated according to their direction.

Angle A is the angle between the meridian and a line joining the craft and the beacon. It is measured clockwise and the signals are characteristically modulated by the beacon so that they define angle A and no other angle.

Angle B is the relative bearing, measured clockwise, of the beacon station with respect to the craft heading and it is determined by the automatic radio direction finder in the craft. Angle H is the absolute heading of the craft clockwise from true North, and it is this angle which it is desired to determine from the data provided by angle A and angle B.

but
$$H = A + C$$
therefore
$$C = 180° - B$$
$$H = 180° + B - B$$

Therefore, H which is the desired result, namely, the absolute heading of the craft, is equal to the difference between A and B plus 180°.

Figure 2:
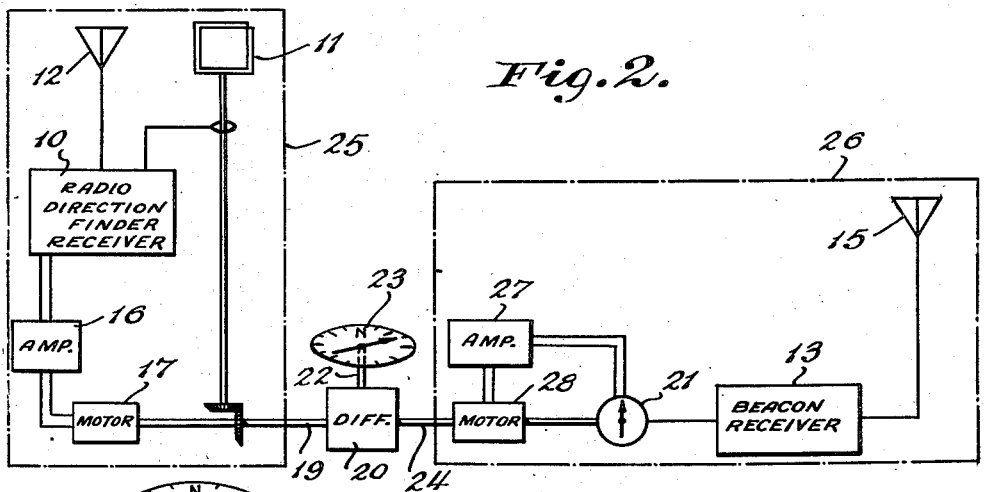
Fig. 2 is a block diagram of one embodiment of the invention.

Referring now to Fig. 2, there is shown apparatus adapted to be mounted on a craft for providing a continuous and automatic indication thereon of the craft's absolute heading. An automatic direction finder 25 tuned to a radio signal at the beacon position has an output shaft 19, the angular position of which is indicative of the bearing of the radio transmitter relative to the shaft, angle B of Fig. 1. Beacon responsive means 26, tuned to a beacon transmitter at the beacon location is arranged to derive the absolute bearing of the craft relative to the transmitter, angle A of Fig. 1, and indicate this information in terms of the angular position of beacon means output shaft 24. Output shafts 19 and 24 are connected to angular combining means 20 which may be a differential gear mechanism. The combining means 20 is adapted to derive the difference between the angular position of shafts 19 and 24. An output shaft 22 from the combining means 20 responds to this angular difference (A—B) and drives an indicator 23 suitably marked so that the latter provides a continuous indication of the absolute heading of the craft, according to the formula $$H = 180° + (A - B)$$

The automatic radio direction finder 25 is shown for purposes of illustration as the same general type as the now well-known type of automatic radio direction finder such as shown by J. E. Browder et al. in Patent No. 2,369,132 issued February 13, 1945. Such an automatic direction finder comprises a rotatable directional loop antenna 11 and a sense antenna 12 which supply radio waves to a direction finder receiver 10. This receiver is adapted to produce a low frequency signal whose amplitude and phase is dependent upon the angular displacement and sense of direction of the loop antenna 11 from its null position. This signal is therefore suitable after amplification in amplifier 16 to energize a servo motor 17, which drives the loop 11 to the null position and maintains it there. The radio direction finder is not limited to the type using a loop antenna but may be of another type such as a microwave frequency type utilizing a reflector to form a sharp beam.

The basic elements of one embodiment of the beacon responsive means 26 comprises antenna 15 and receiver 13 wherein the modulation from the beacon transmitter caused by the rotating radiation pattern is compared in phase with a reference modulation transmitted on a separate radio carrier or subcarrier. Phase meter 21 indicates the phase relationship between these two signals and in combination with amplifier 27, and motor 28 actuates shaft 24 according to the phase position. The beacon receiver 13 may take the general form of the apparatus disclosed by D. G. C. Luck in Patent No. 2,208,376, issued July 16, 1940. The beacon receiver 13 may be combined with direction finder receiver 10, to conserve space and weight, and avoid unnecessary duplication of parts.

Figure 3:
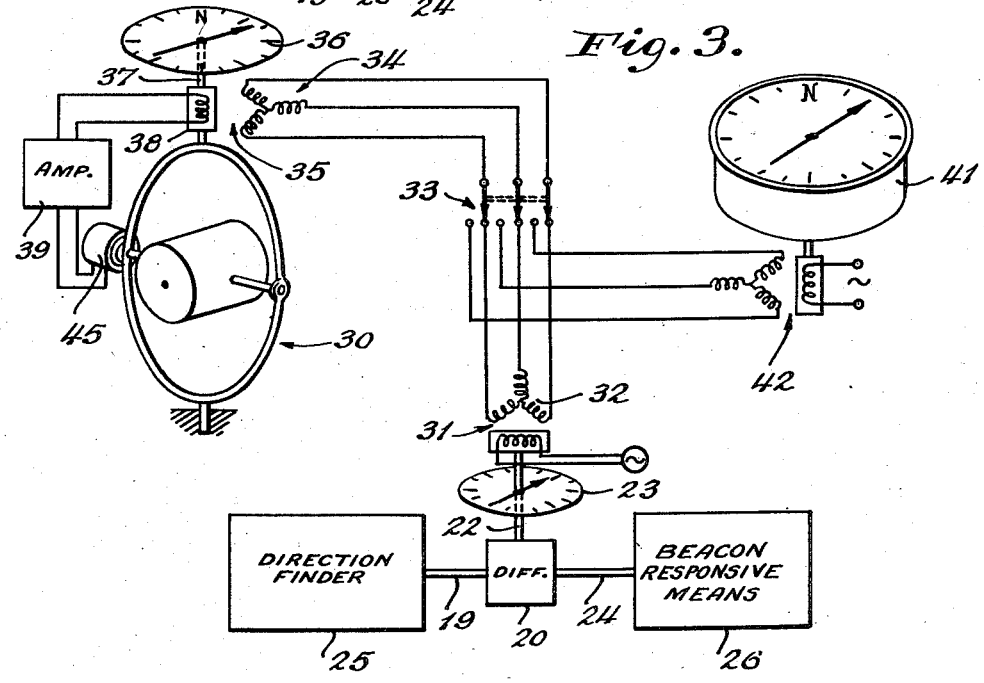
Fig. 3 is a block diagram of a second embodiment of the invention.

Referring to Fig. 3, there is shown an embodiment of the invention utilizing the radio derived, absolute bearing indication to exercise a "slave" control over a directional gyroscope 30. The direction finder means 25, and the beacon responsive means 26 correspond to the dotted portions 25 and 26 of Fig. 2. The direction finder 25 output, corresponding to angle B of Fig. 1, is introduced to differential 20 by shaft 19 and the beacon 26 input, corresponding to angle A, is introduced by shaft 24. The differential output rotation of shaft 22 is a function of the absolute craft heading angle H and drives the rotor of the synchronous generator 31, the stator winding 32 of which may be connected through switch 33 to the stator windings 34 of a second synchro 35. The rotor winding 38 is connected through shaft 37 to an axis of the directional gyroscope 30 and to the indicator 36 which presents a stabilized gyro compass heading.

The radio compass output of shaft 22 exercises a slave control over the directional gyroscope in the following manner. If the shaft 22 turns it will change the voltages induced in winding 32 of synchro 31. This will also change the voltages across winding 34 of synchro 35 which will induce an error signal in winding 38, which error signal will energize amplifier 39 which in turn will actuate torque mechanism 45 to thereby apply a torque to the directional gyroscope 30 tending to precess the gyroscope in the proper direction to thereby move shaft 37 into angular correspondence with shaft 22. The torque mechanism may be of a conventional type wherein a pair of solenoids mounted on the gimbal rings of the gyroscope may be energized to thereby precess the gyroscope.

If desired, the gyroscope may be controlled by the magnetic compass 41 by turning switch 33 to the magnetic compass position and the magnetic compass output of synchro generator 42 will control synchro control transformer 35 in the same manner as previously described. This condition of operation is useful when no beacon signals are available. The switch 33 may be provided with a third or "off" position, so that the radio compass may be switched from one station to another without coming under the control of the magnetic compass 41 which may be subject to considerable deviation.

Figure 4:
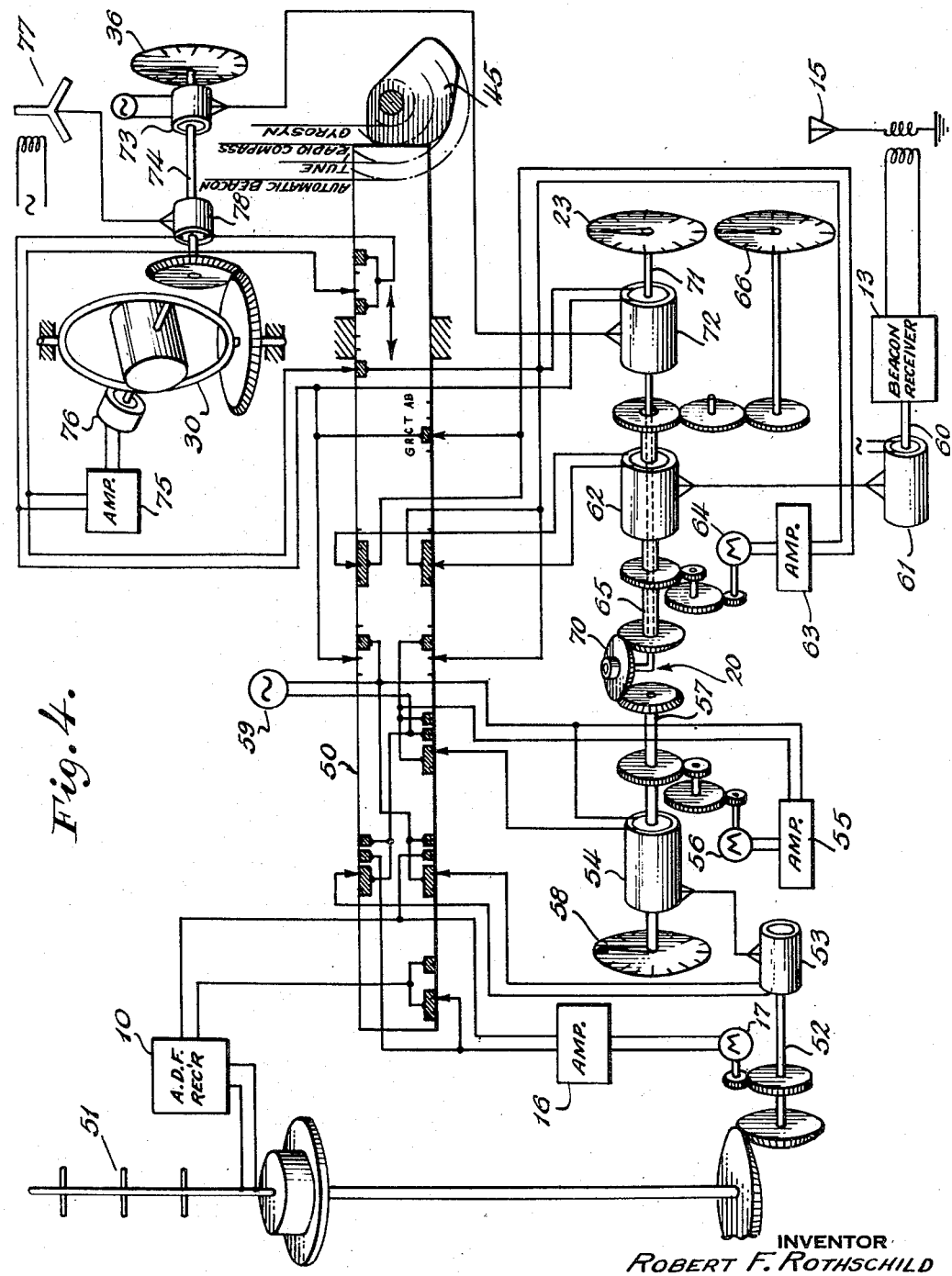
Fig. 4 is a block diagram of a third embodiment of the invention.

Fig. 4 illustrates an embodiment of the invention which may be switched to any of four separate modes of operation as follows:

1. Gyrosyn operation—a directional gyro slaved to a conventional compass;
2. Radio compass operation — the directional gyro slaved to the radio compass wherein angle H is computed from angles A and B;
3. "Tune" position wherein the direction finder angle B is computed from H and A, and the directional antenna is preset;
4. "Artificial beacon" position wherein the beacon angle A is computed from H and B.

Thus, it is seen that any angle may be computed from the other two angles. Many situations may arise in which this information would be helpful. For instance, the craft may be navigating in regions where any one of the three signals H, A or B is faulty or absent due to equipment failure or other reasons. This computer information is also adapted to be easily utilized for automatic piloting applications, or as an independent check on the system components.

The functions of the positions 1 and 2 have been previously discussed in connection with Fig. 3.

The third or "Tune" position computes independently, the angle B, which is ordinarily provided by the direction finder, and in addition, drives the directional antenna into coincidence with this angle. This operation is quite convenient where a pilot a long flight is switching from one beacon station to another. He merely tunes the beacon receiver to the next beacon station and then switches to the "Tune" position, and the direcional antenna is automatically trained approximately on the new station. The pilot then switches back to the "Radio compass" position and the direction finder orients itself exactly on the new station. This computed information may also be utilized to check the general system operation and particularly to check the direction finder operation, or to check that the direction finder is receiving the right radio station. This approximate presetting of the directional antenna is quite advantageous in the use of an antenna such as a microwave antenna having a very narrow reception beam, as it is not necessary to search around by trial and error to find the proper direction.

Position four computes the beacon angle A from the other two angles. This computed information will enable the pilot to maintain a ground track course which is radial to the radio station by maintaining a constant A angle. It would not be possible to do this by means of the compass or direction finder alone because of the effect of drift due to cross winds. This information is also easily adapted to be used as input to an automatic pilot to maintain such a course.

Fig. 4 shows the selector switch in the "Radio compass" position. The selector switch comprises a long insulating member 50 which is adapted to slide along its length axis in response to the movement of a four position cam 45. The insulating member 50 has various contacts and connections mounted on it to perform the necessary switching operations.

In "Radio compass" position, the directional gyro 30 is controlled by the output of the radio compass wherein the heading H is computed from the direction finder output B and the beacon angle A. D. F. signals are picked up on the directional antenna 51 which may be a loop for the lower frequencies or an array of antenna elements and reflectors at the higher frequencies. These signals are then supplied to the automatic direction finder receiver 10. Since the cam 45 is in the "Radio compass" position, the switch member 50 is so set that the output of the direction finder receiver is supplied to amplifier 16 and motor 17. Motor 17 drives the directional antenna into coincidence with the direction of the received signal in response to signals from amplifier 16.

Mounted on the same shaft 52 as the antenna drive mechanism is a Selsyn transmitter 53. Power is supplied to the rotor of this Selsyn from power supply 59 through the contacts of the switch member 50. The stator of Selsyn 53 is connected to the stator of a Selsyn 54, the rotor of which is connected through switch member 50 to amplifier 55. The rotor of Selsyn 54 generates an error signal proportional to the difference between its angular position and that of the rotor of Selsyn 53. This error signal is applied to amplifier 55 which actuates motor 56 to rotate the shaft 57 on which Selsyn 54 is mounted to thereby reduce the amount of the angular error to zero. When this occurs, the D. F. indicator 58 is in alignment with the D. F. antenna 51 and indicates the angle B, and shaft 57 applies the direction finder or B angle to differential 20.

Signals from a beacon station are simultaneously received on the beacon antenna 15, and supplied to the beacon receiver 13 which rotates shaft 60 proportionally to the received beacon angle A. A transmitter Selsyn 61 is mounted on shaft 60 and its stator is connected to the stator of Selsyn 62, the rotor of which supplies an error signal through switching element 50 to amplifier 63. The amplifier 63 actuates motor 64 to drive shaft 65 into angular correspondence with shaft 60, the angular position of which is proportional to the angle A received by beacon receiver 13. This rotation of hollow shaft 65 provides the beacon input to the differential 20 and also indicates the angle A directly on beacon indicator 66.

When the direction finder input shaft 57 and the beacon member shaft 65 are aligned with their respective receivers, third member 70 of the differential 20 takes an angular position corresponding to the difference of the angular positions of the other two members. The position of member 70 is transmitted by means of shaft 71 to the radio compass indicator 23 which thereby gives instantaneous indication of the heading of the craft angle H with respect to true North.

The directional gyro 30 is slaved to the radio compass output as follows. Selsyn transformer 72 is mounted on shaft 71 and its stator is connected to the stator of Selsyn 73 which is mounted on shaft 74 together with the stabilized compass indicator 36. Any angular miscorrespondence between the radio compass indicator 23 and the gyro stabilized compass indicator 36 will generate an error signal in the rotor of Selsyn 72 which is connected through switch element 50 to amplifier 75. Amplifier 75 energizes the torque mechanism 76 which is adapted to precess the directional gyro 30 in response to the error signal from amplifier 75 into a position of angular correspondence between the radio compass indicator 23 and the gyro stabilized compass indicator 36.

In "Gyrosyn" position, the directional gyro 30 is slaved to a conventional compass represented by flux valve 77. In this position, the amplifier 75 is disconnected from the Selsyn transformer 72 and is connected to Selsyn transformer 78 which is actuated by the flux valve compass 77. Therefore, the gyro stabilized indicator 36 gives conventional gyrosyn heading indication. In "Gyrosyn" position, the radio compass operates independently, and the radio compass indicator 23 may be used as a check against the heading as given by the gyrosyn indicator 36.

The "Tune" position operates in the following manner, to compute angle B and to preset the directional antenna. Beacon signals are received by beacon receiver 13 which actuates shaft 60 which, in turn, rotates shaft 65 through Selsyns 61 and 62 to provide the beacon angle A input to the differential 20, in the same manner as in "Radio compass" position.

In this position the gyroscope 30 is free running but will maintain its heading for a reasonable period of time. The angle "H" information is supplied to the differential 20 as follows.

Selsyn 73, mounted on shaft 74 which is the output shaft of the gyroscope 30, transmits the position of stabilized compass indicator 36 to Selsyn 72 and an error signal is generated in the rotor of Selsyn 72 which is proportional to the angular difference between shaft 71 and shaft 74. This error signal is fed through switch 50 to amplifier 55 which energizes motor 56 to rotate shaft 57, thus providing the angle H input to the differential 20. This rotation of shaft 57 is transmitted through the differential 20 and rotates the rotor of Selsyn 72 into angular correspondence with the rotor of Selsyn 73. In this condition the angular position of shaft 57 and indicator 58 is proportional to the angle B.

The directional antenna 51 is rotated into the direction of the received radio signals as follows: Selsyn 54 which is mounted on shaft 57 is energized by source 59 and it transmits its angular position to the stator of Selsyn 53, the rotor of which generates an error signal which is connected through switch member 50 to amplifier 16. Amplifier 16 energizes motor 17 which rotates the antenna 51 into approximate angular correspondence with the direction of received signals. This function prevents hunting of the antenna 51 and permits the use of a highly directional antenna. Once the antenna is approximately lined up on the station, the pilot may switch to the radio compass position for normal operation.

In the "Artificial beacon" position, the angle A is derived from the known inputs H and B. The angle B input is supplied to the differential 20 by operation of the automatic radio direction finder in the same manner as in the "Radio compass" position and the H input is supplied by the directional gyro 30 which is slaved to the flux valve compass 77 in the following manner. The position of flux valve compass 77 is transmitted to Selsyn 78 which is mounted on shaft 74 and the rotor of Selsyn 78 generates an error signal proportional to the angular difference between shaft 74 and the heading of the flux valve compass 77. This error signal is applied to amplifier 75, the output of which energizes torque unit 76 which precesses directional gyro 30 and rotates shaft 74 into angular correspondence with the heading of flux valve 77.

The gyro stabilized compass indicator 36 now indicates the heading as determined by flux valve compass 77. This heading is transmitted by Selsyn 73 to Selsyn 72 which is mounted on shaft 71. The rotor of Selsyn 72 generates an error signal proportional to the angular difference between shaft 71 and shaft 74. This error signal is connected to amplifier 63 through the switch member 50 and the amplifier 63 energizes motor 64 which drives shaft 65 and shaft 71 through differential 20 until the angular position of shaft 71 corresponds with the angular position of shaft 74.

Therefore, the B and H inputs are supplied to the differential 20 and its output is proportional to the beacon angle A and is transmitted by shaft 65 to the beacon indicator 66, thus providing the beacon information, angle A, without the operation of the beacon receiver 13.

As previously mentioned, the "Artificial beacon" position may be used to check the operation of the beacon receiver and its associated components, or may be utilized to fly a course having a course radial to the radio station, regardless of drift effect.

Since many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

What is claimed is:

1. In a craft navigation system, means for obtaining first signals from a fixed point characterized according to their absolute direction, means for obtaining second signals dependent upon the bearing of said fixed point relative to a craft heading, and means for combining said first and second signals to thereby obtain the absolute craft heading.

2. In a radio navigation system of the type utilizing an omniazimuthal radio beacon adapted to transmit first signals characteristic of their direction; the combination of a craft direction finder means responsive to said first signals from said beacon position including means for providing a second signal dependent on the bearing of said beacon relative to the axis of said craft, and means to combine said first and second signals to thereby determine the heading of said craft.

3. In a radio navigation system, means for obtaining signals from a reference point characterized according to their absolute direction, a craft radio direction finder adapted to receive signals from said reference point and to determine the bearing of said reference point relative to said craft axis, and means for combining said direction signals and said bearing signals to thereby determine the absolute heading of said craft.

4. Craft navigation apparatus comprising a radio compass adapted to provide absolute craft heading information, a directional gyroscope adapted to be automatically controlled in response to said radio compass to thereby present a stabilized gyro compass indication of the absolute craft heading.

5. In a craft navigational system of the type having an omnidirectional radio beacon adapted to transmit signals characteristic of their direction; a craft radio compass responsive to said beacon, a craft directional gyroscope, means to automatically control said directional gyroscope in response to said radio compass to thereby present stabilized gyro compass indication of the absolute craft heading.

6. Craft navigation apparatus comprising a radio compass adapted to provide absolute craft heading, a magnetic compass adapted to provide absolute craft heading, and a directional gyroscope, means to automatically control said directional gyroscope in response to either said radio compass or said magnetic compass, to thereby present a stabilized gyro compass indication of the absolute craft heading.

7. In a craft navigation system of the type having an omniazimuthal radio beacon adapted to transmit signals characteristic of their direction, the combination of a craft radio receiver responsive to said signals to thereby provide an indication of said direction, a craft radio direction finder responsive to said beacon to thereby determine the bearing of said beacon relative to said craft axis and means comprising a mechanical differential to combine said signal direction with said beacon bearing relative to said craft axis to thereby determine the absolute heading of said craft.

8. In a craft navigation system of the type having an omnidirectional radio beacon adapted to transmit signals characteristic of their absolute angular direction; a craft radio receiver responsive to said signals to thereby provide an indication of said direction, a craft radio direction finder responsive to signals from said beacon position to thereby determine the bearing of said beacon relative to said craft axis and means to combine said signal direction with said beacon bearing to thereby determine the absolute heading of said craft.

9. Craft radio navigation apparatus for use in conjunction with a ground radio station comprising means for obtaining the bearing of a radio station relative to the axis of a craft, means for obtaining the bearing of said craft relative to said radio station, means for obtaining the bearing of the axis of the craft relative to north, and computing means constructed and arranged to add any two of said bearing signals algebraically to thereby obtain an indication of the third bearing.

10. Navigation apparatus for a craft comprising a radio beacon receiver, a radio direction finder receiver, and computing means responsive to said receivers for adding algebraically the outputs of the receivers, and an indicator responsive to said computing means to indicate the craft heading.

11. In a craft navigation system, means for receiving first signals from a fixed point characterized according to their absolute direction, means for obtaining second signals proportional to the craft heading, and means including a mechanical differential for combining said first and second signals to thereby obtain the bearing of said fixed point relative to said craft heading.

12. In a craft navigation system of the type employing a directional antenna, means for obtaining first signals from a fixed point characterized according to their absolute direction, means for obtaining second signals proportional to the craft heading, means for combining said first and second signals to thereby obtain the bearing of said fixed point relative to said craft heading, and means to point said directional antenna in the direction of said received signals.

13. In a craft navigation system, a radio receiver for obtaining omni-azimuth signals from a fixed point which are characterized by their instantaneous direction, a direction finder for obtaining second signals dependent upon the bearing of said fixed point relative to the craft heading, means for obtaining third signals proportional to the craft heading, and a mechanical differential adapted to compute any signal from the other two signals.

14. Craft radio navigation apparatus for use in conjunction with an omni-azimuth radio station beacon comprising means for receiving a signal proportional to a parameter A, means for locally generating a signal proportional to a parameter B, and means constructed and arranged to combine said two parameters to thereby obtain an indication of H the third parameter of the equation:

$$H = 180 + A - B$$

Wherein A is an angle in degrees proportional to the bearing of said craft relative to said radio station; B is an angle in degrees proportional to the bearing of said radio station relative to the axis of said craft; and H is an angle in degrees proportional to the absolute bearing of the heading of said craft.

ROBERT F. ROTHSCHILD.

REFERENCES CITED

The following references are of record in the file of this patent:

UNITED STATES PATENTS

| Number | Name | Date |
| --- | --- | --- |
| 1,983,079 | Hansen | Dec. 4, 1934 |
| 2,247,029 | Luck | June 24, 1941 |
| 2,257,320 | Williams | Sept. 30, 1941 |
| 2,296,041 | Luck | Sept. 15, 1942 |
| 2,390,383 | Neufeld | Dec. 4, 1945 |

Certificate of Correction

Patent No. 2,539,482  January 30, 1951

ROBERT F. ROTHSCHILD

It is hereby certified that error appears in the printed specification of the above numbered patent requiring correction as follows:

Column 3, line 10, for "$H=180°+B-B$" read $H=180°+A-B$; line 23, for the word "shaft" read *craft*; column 5, line 12, after "pilot" insert *on*;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*